United States Patent [19]
Storkan et al.

[11] Patent Number: 5,277,655
[45] Date of Patent: Jan. 11, 1994

[54] VENTILATING APPARATUS FOR FARM EQUIPMENT USED IN THE FUMIGATION OF CROP FIELDS

[75] Inventors: Dean C. Storkan, Pebble Beach; Douglas J. Buessing, Gilroy; Verdiano Donatini, Aptos, all of Calif.

[73] Assignee: Trical, Inc., Hollister, Calif.

[21] Appl. No.: 970,687

[22] Filed: Nov. 4, 1992

Related U.S. Application Data

[63] Continuation-in-part of Ser. No. 912,801, Jul. 13, 1992.

[51] Int. Cl.$^5$ .............................................. B60H 1/32
[52] U.S. Cl. ...................................... 454/143; 62/314; 454/157; 454/189
[58] Field of Search ............... 454/143, 152, 157, 158, 454/159, 46, 66, 188, 189, 337; 62/314

[56] References Cited

U.S. PATENT DOCUMENTS

| | | | |
|---|---|---|---|
| 2,627,217 | 2/1953 | Hainke et al. | 454/66 |
| 2,700,927 | 2/1955 | Jordan | 454/157 X |
| 2,817,281 | 12/1957 | Schwan et al. | 454/189 |
| 2,837,020 | 6/1958 | Gaspardo | 454/143 X |
| 3,126,810 | 3/1964 | Karlsson et al. | 454/189 |
| 3,524,398 | 8/1970 | Winfrey | 454/157 X |
| 4,308,222 | 12/1981 | Guettel et al. | 62/314 X |

*Primary Examiner*—Harold Joyce
*Attorney, Agent, or Firm*—Claude A. S. Hamrick; Harold T. Fujii

[57] ABSTRACT

Ventilating apparatus for farm equipment used in the fumigation of crop fields including the provision of a ducted blower unit disposed directly above the head of a fumigation equipment operator so as to cause a continual downward flow of air over the operator's body when the equipment is in use. The apparatus includes a shroud for housing an electrically or hydraulically driven fan which collects air from the space above the tractor and forces it downward in a flow enveloping the operator. In alternative embodiments, various filtration devices may be utilized as well as flow directing deflector assemblies, heat exchangers and misting applicators.

22 Claims, 5 Drawing Sheets

VENTILATING APPARATUS FOR FARM EQUIPMENT USED IN THE FUMIGATION OF CROP FIELDS

CROSS-REFERENCE TO RELATED APPLICATIONS

This application is a continuation-in-part of U.S. patent application Ser. No. 07/912,801 (filed Jul. 13, 1992) entitled "Ventilating Apparatus for Farm Equipment Used in the Fumigation of Crop Fields", assigned to the assignee of the present invention.

BACKGROUND OF THE INVENTION

1. Field of the Invention

The present invention relates generally to apparatus for protecting farm workers from hazardous materials, and more particularly to a novel ventilating apparatus for reducing the exposure of an equipment operator to fumes emanating from the treated ground or fumigating apparatus drawn by a towing vehicle.

2. Background of the Invention

In the agricultural industry, there is a continual need to eradicate and control weeds and soil-borne insects and diseases. One way in which this is accomplished is by means of a process called pre-plant soil fumigation, which has been used for many years with ongoing refinements in methods and techniques to improve efficacy, efficiency and reduce the cost of application.

Chief among the crops which benefit from pre-plant soil fumigation are strawberries, grapes, peppers, onions, deciduous fruits and nuts, turf, cut flowers, and tree and seedling nurseries. The most effective fumigants for crops of the type listed are mixtures of methyl bromide and chloropicrin which are selected in varying ratio and strength, depending on the target soil pest and soil variances of temperature, texture and moisture.

Typically, a field is prepared for fumigation by the grower who tills and irrigates the soil to ensure proper texture and moisture. A commercial fumigator then enters the field with a tractor and tool bar mounted to the rear, to which are attached plumbed shanks that penetrate the soil and deliver the fumigant to the desired depth. Depending on desired effects, the field may be tarped with a polyethylene film which is applied by a roller attached to the tractor. The field is normally ready for planting thereafter within two weeks.

Soil preparation, type and amount of fumigant, and method of application are all part of a process which is regulated by the U.S. EPA and CAL EPA through pesticide labeling laws. One of the concerns associated with the process is worker exposure to the pesticides that may occur through contact or inhalation. For methyl bromide/chloropicrin mixtures, inhalation is the typical route of exposure and over a period of years, has been regulated downwardly.

Current laws allow a single limit exposure and a time-weighed eight hour exposure limit of 5 ppm of methyl bromide in air. Soon to be enacted by CAL EPA and U.S. EPA are rules that will lower the allowed exposure levels even further.

As measured by field monitoring, current exposure levels experienced by the equipment operator are in the range of 0-2 ppm. These levels, though well within limits under current rules, will not be allowed under the proposed new rules.

SUMMARY OF THE PRESENT INVENTION

It is therefore a principal objective of the present invention to provide a means for reducing the exposure level of a tractor operator during the performance of fumigation applications.

Another object of the present invention is to provide apparatus of the type described which aids in the dilution of fumes generated by fumigating operations.

Still another object of the present invention is to provide apparatus of the type described which does not interfere with the normal operation of the fumigation equipment, yet provides a substantially increased factor of safety for the operator.

Briefly, a preferred embodiment of the present invention includes the provision of a ducted blower unit disposed directly above the head of a fumigation equipment operator so as to cause a continual downward flow of air over the operator's body when the equipment is in use. The apparatus includes a shroud for housing an electrically or hydraulically driven fan which collects air from the space above the tractor and forces it downward in a flow enveloping the operator. In alternative embodiments, various filtration devices may be utilized as well as flow directing deflector assemblies, heat exchangers and misting applicators.

An important advantage of the present invention is that it substantially speeds the rate of dilution of airborne fumigant gas in the vicinity of the equipment operator.

Another advantage of the present invention is that it directs a stream of downwardly flowing air through the driver's breathing zone, creating positive air pressure to reduce or eliminate any fumigant that might enter the driver's breathing zone from the soil being fumigated just to the rear of the tractor.

Still another advantage of the present invention is that it provides a downward draft which encourages the mixing and dilution with air of any fumigant which may escape from the soil and reach the operator's position during and immediately after the injection of fumigant into the soil.

These and other objects and advantages of the present invention will no doubt become apparent to those skilled in the art after having read the following detailed description of the preferred embodiments which are illustrated in the several figures of the drawing.

IN THE DRAWING

DETAILED DESCRIPTION OF THE PREFERRED EMBODIMENTS

Figure 1:
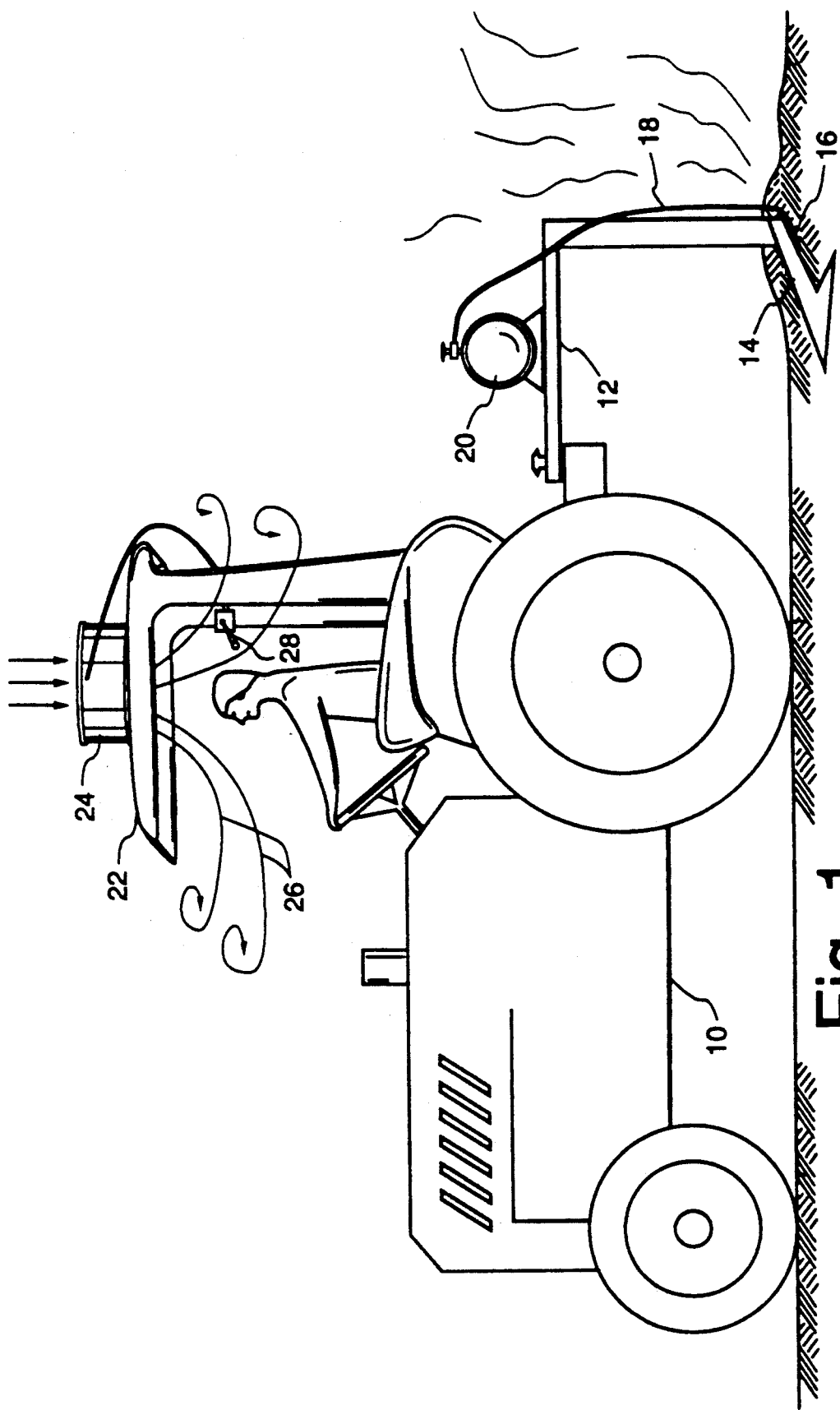
FIG. 1 is a diagrammatic representation of a fumigation system showing the present invention disposed above the head of an operator.

Referring now to FIG. 1 of the drawing, a tractor is shown at 10 pulling a tool bar 12 to which are attached shanks 14, that are plumbed with fumigant dispense nozzles 16 connected by a suitable conduit 18 to a gas reservoir 20 carried by either the tool bar or the tractor per se. The tractor 10 is of conventional design and includes a canopy structure 22 for providing a shading roof over the tractor operator. Affixed to the top of canopy 22 and in registration with an opening (not shown), centered about the normal position of the operator's head, is a ventilating device 24 that draws air in from the space above the tractor and creates a forced flow downwardly around the operator, as indicated by the arrows 26. As will be further described below, the device 24 includes an outer shell that simultaneously forms a housing for an air mover and creates a passageway for air to be moved downwardly toward the operator. The air mover (not shown) is energized either electrically or hydraulically and is controlled by a speed control lever 28.

As previously mentioned, fumigating gases injected into the soil by the nozzle 16 will in many cases find their way out of the soil and, being lighter than air, rise as indicated, and be drawn into the backwash following the tractor. In some cases the gases will reach the operator and subject him to unacceptable levels of exposure to the fumigant. In accordance with the present invention, such exposure is greatly lessened by the flow of air across the space occupied by the operator, in most case preventing operator contact. But even in those cases where some gas reaches the breathing space of the operator, it is substantially diluted by the high velocity flow of air.

Exposure levels to the operator using the present invention show field trial measurements of less than 200 ppb (parts per billion) time weighed over a 24-hour interval. The device therefore performs a necessary and essential function in the pre-plant soil fumigation process and represents a new and unique method of limiting exposure to methyl bromide in field applications. The device can also be used to limit exposure to other soil fumigants such as Telone and Metam Sodium, as well as other pesticides, fertilizers and other toxic materials that escape into the ambient air after application.

Figure 2:
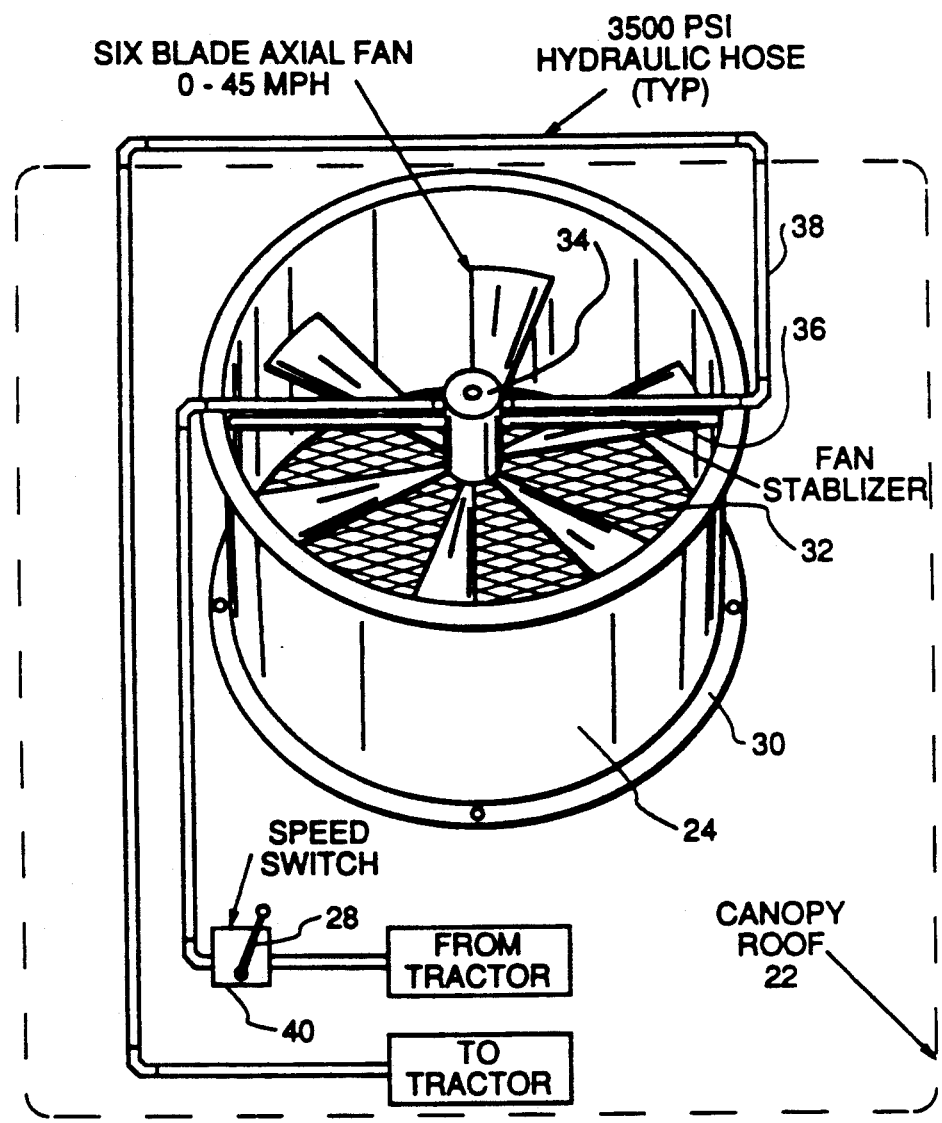
FIG. 2 is an upper level perspective view showing the present invention.

Referring now to FIG. 2 of the drawing, the principal operative components of the subject device are depicted in generalized detail. The housing 24 is shown as being a cylindrical duct-forming body, flanged at top and bottom for rigidity. The lower flange 30 also serves as a means by which the device can be bolted to the tractor canopy in surrounding relationship to a corresponding aperture formed therein. As depicted, the upper end of the cylindrical housing is left open, and an expanded metal screen 32 is affixed to the lower end to ensure that no foreign debris, birds, or other materials are thrown into contact with the operator.

Disposed coaxially within the housing 24 is a hydraulic motor 34 that is supported relative to the housing by a pair of stabilizing brackets 36. Motor 34 drives a six-bladed axial fan attached directly to its shaft and is energized by a high-pressure flow of hydraulic oil passed therethrough via a 3500 psi hydraulic hose 38. The hose 38 is operatively coupled to the hydraulic system (not shown) of the tractor, and the rate of flow of fluid, and thus the speed of motor 34, is controlled by the lever 28 of a speed switch 40. In operation, the operator merely selects a convenient flow of air by adjusting the position of handle 28. The fan will direct a stream of air through the housing 24 and screen 32 at a velocity of between 0 and 45 miles per hour downward through the driver's breathing zone, creating positive air pressure to reduce or eliminate any fumigant that might otherwise enter the driver's breathing zone (from the soil being fumigated at the rear of the tractor). Additionally, the downward draft encourages mixing and dilution with air of any fumigant which might escape from the soil during and even after injection.

Figure 3:
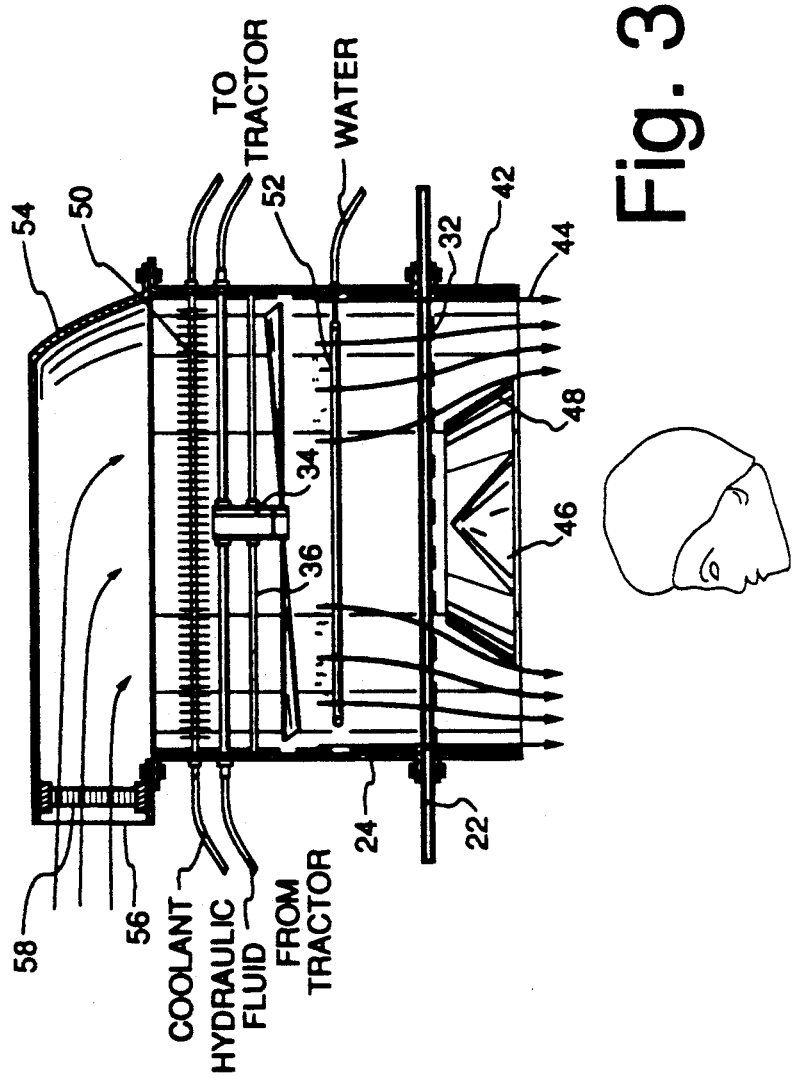
FIG. 3 is a cross-sectional view showing the embodiment of FIGS. 1 and 2, having additional optional features combined therewith.

Turning now to FIG. 3, additional features are depicted which may be included in the basic embodiment previously illustrated. One alternative of the present invention is to provide a flow deflector assembly 42 beneath the screen 32 to create a more or less tubular flow of air about the operator's head, as depicted by the arrows 44. This has the advantage of shielding the breathing space of the operator from contamination without subjecting his head and face to a perhaps chafing air flow. Such a deflector might include one or more baffles 46 and 48 for diverting the air flow in cylindrical fashion about the operator's head and perhaps even his entire upper torso.

As another alternative, a heat exchanger 50 may be included within the induced air stream, and tractor engine coolant diverted therethrough to warm the air before it is directed over the operator. A suitable valve (not shown) located in the coolant line would allow the operator to select the air temperature.

As a further alternative, where the use is in an extremely hot climate, it may be appropriate to add a misting element, such as the perforated ring 52, to inject moisture into the air flow to cool same by well-known evaporative processes. In this case a separate water reservoir and pump would be required.

Still another improvement might include the provision of a bonnet 54 having a forward-facing opening 56 that includes perhaps even a suitable filtering element 58. The forward directed opening 56 would tend to further limit the possible exposure of the operator to aft applied materials.

Figure 4:
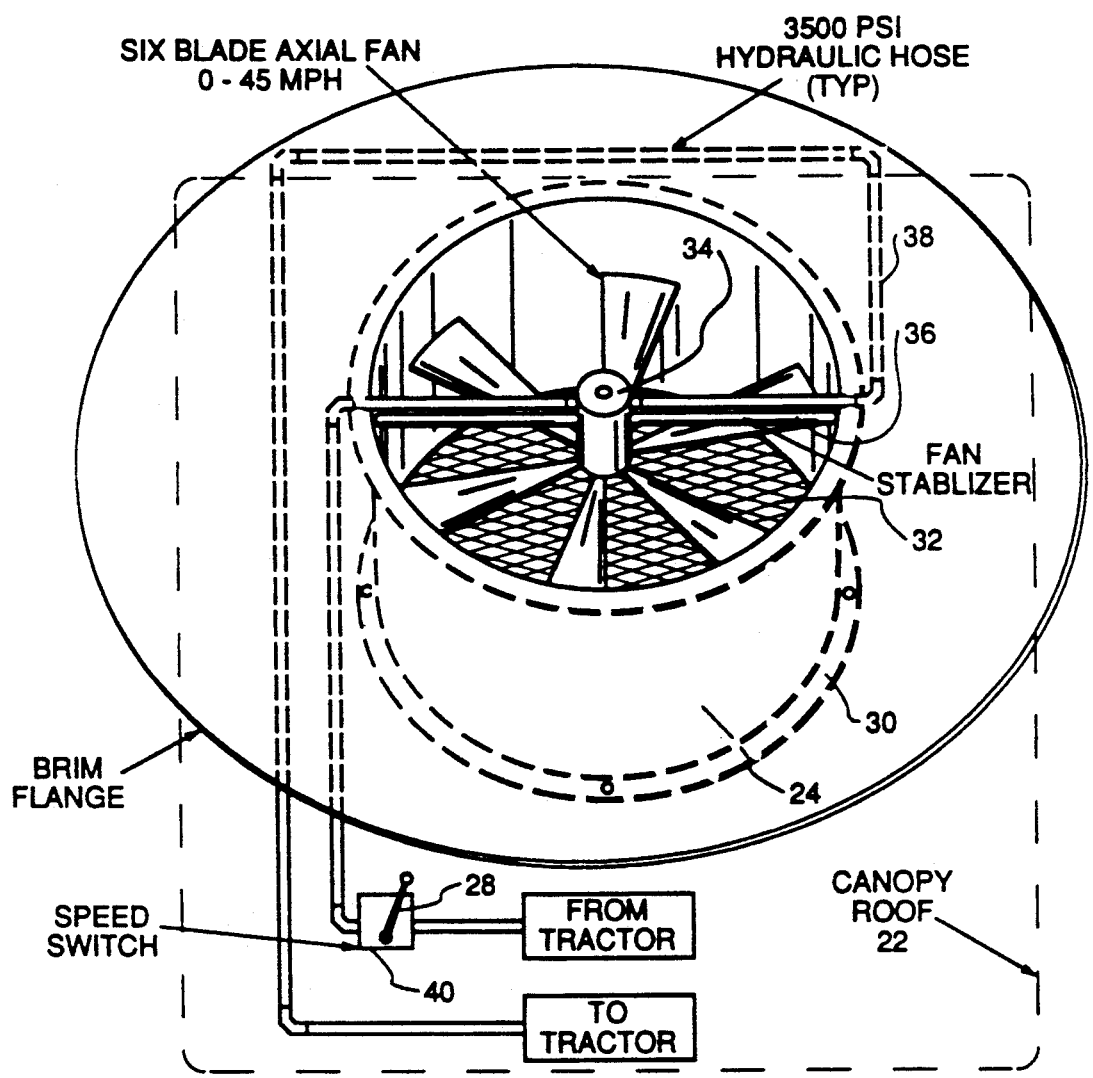
FIG. 4 is an upper level perspective view showing an alternative embodiment of the present invention.
Figure 5:
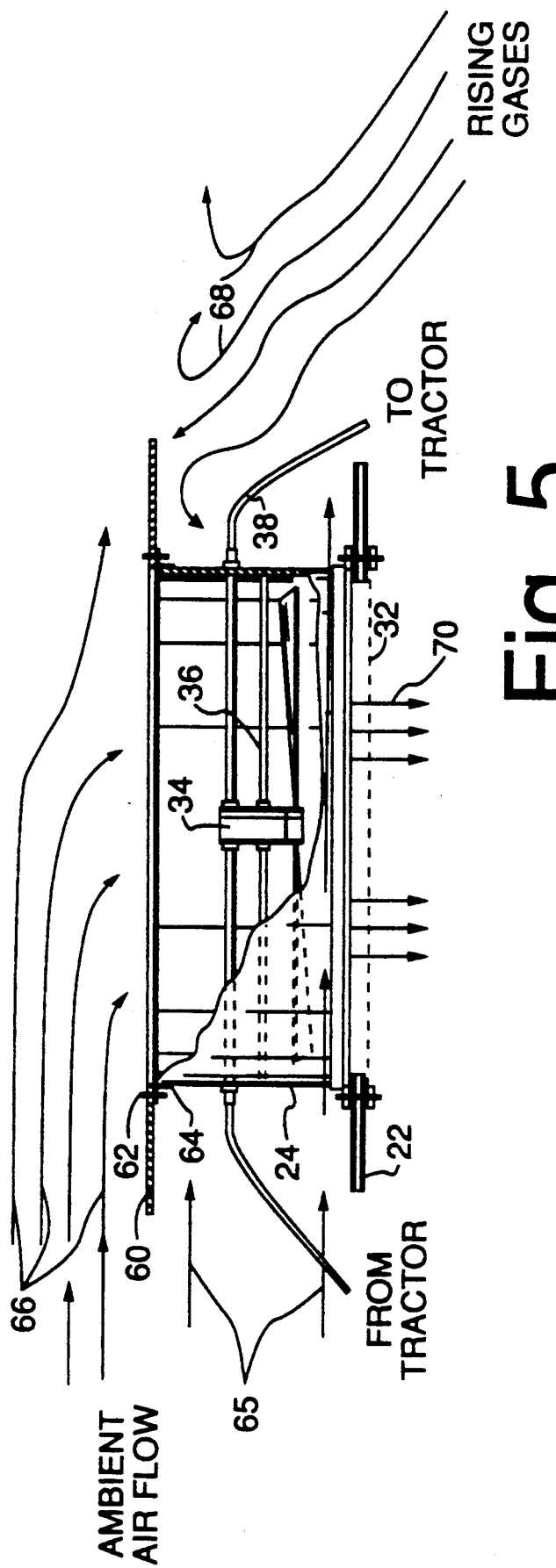
FIG. 5 is a cross-sectional view showing the embodiment of FIG. 4.

In FIG. 4, yet another improvement is illustrated which may be included in the basic embodiment previously depicted. A flow-directing brim ring or flange 60 is attached to the upper end of the cylindrical housing 24. As further illustrated in FIG. 5, the flow-directing ring or flange 60 is mechanically connected, via a plurality of fasteners 62, to a top flange 64 disposed at the open end of the cylindrical housing 24.

In operation, as the device moves through the ambient air, the relative air flow is as generally illustrated by the arrows 65 and 66, with the result that the ring 60 blocks, as suggested by the arrows 68, fumigating gases arising at the rear of the tractor, from entering the housing inlet.

The ring 60 has been depicted with a generally circular shape. However, the ring may also be shaped in a rectangular or oblong manner. Also, the ring may be formed in a non-flat shape. That is, the ring may be upturned or downturned along its periphery, as appropriate, to optimize its operational performance. For example, for some applications a ring with a downturned trailing edge (i.e. an edge facing the rear of the tractor) may be more efficient than a flat shaped ring at blocking out the rising fumigating gases. Also, a ring with an upturned leading edge (i.e. edge facing the tractor front) may be more efficient, than a flat shaped ring, for augmenting the flow of fresh air into the housing.

Although a presently preferred embodiment and several alterations thereof have been disclosed above, it is anticipated that other alterations and modifications will become apparent to those skilled in the art after having read the above disclosure. For example, the housing 24 could be configured to accommodate more that one motor and/or fan. Furthermore, the entire apparatus could be integrated into the tractor canopy. Moreover, although not believed to be as desirable as the disclosed embodiments, the blower assembly could be positioned forwardly of the operator to provide a rearwardly directed flow of air across the operator. It is therefore intended that the following claims be interpreted as covering all such alterations and modifications as fall within the true spirit and scope of the invention.

What is claimed is:

1. An operator safety apparatus for attachment to the canopy of a tractor used to disseminate fumigating gases, fertilizers, and other toxic chemicals, comprising:
   a housing affixed to said canopy and including an inlet opening disposed above said canopy and an exit opening disposed below said canopy, said housing being adapted to provide a flow passageway from above said canopy to below said canopy;
   motor-driven fan means disposed within said housing and adapted to draw relatively clean ambient air into said housing through said inlet opening and to direct it through said exit opening downwardly about the operator so as to retard the movement of environmental gases into the breathing space of the operator and to enhance mixing and dilution of environmental contaminants with ambient air; and
   a flow-directing ring means circumscribing said inlet opening and serving to enhance entry thereinto of air flowing from the front of the moving tractor and to militate against entry thereinto of air and contaminants rising from the rear of the tractor.

2. An operator safety apparatus as recited in claim 1, wherein said housing is generally cylindrical in configuration along at least a part of its length and the motor-driven fan means is disposed within the cylindrical portion thereof.

3. An operator safety apparatus as recited in claim 2 wherein at least one end of said housing is provided with a screen for blocking the passage of foreign objects without substantially interfering with the flow of air through said housing.

4. An operator safety apparatus as recited in claim 1 and further comprising flow deflector means disposed at the downstream end of said housing for causing the flow of air to surround the operator but be directed away from the location of his head.

5. An operator safety apparatus as recited in claim 1 and further comprising flow-directing bonnet means disposed at said inlet opening to said housing for exclusively directing air from a particular direction into said housing, said bonnet means having an inlet end for receiving air and an outlet end mated with said inlet opening.

6. An operator safety apparatus as recited in claim 5 and further comprising filter means for filtering particulate matter from the flow entering said passageway, said filter means being disposed at the inlet end of said bonnet means.

7. An operator safety apparatus as recited in claim 1 and further comprising heat exchange means disposed within said passageway and adapted to heat the air flowing therethrough, said heat exchange means being operatively associated with the tractor engine coolant system.

8. An operator safety apparatus as recited in claim 1 and further comprising water-injection means disposed within said passageway for spraying water into said passageway to cool the flow of air passing therethrough.

9. An operator safety apparatus as recited in claim 1 wherein said motor-driven fan means includes a hydraulic motor driven by the hydraulic fluid system of the tractor.

10. An operator safety apparatus as recited in claim 5 and further comprising flow deflector means disposed at the downstream end of said housing for causing the flow of air to surround the operator but be directed away from the location of his head.

11. An operator safety apparatus as recited in claim 10 and further comprising heat exchange means disposed within said passageway and adapted to heat the air flowing therethrough, said heat exchange means being operatively associated with the tractor engine coolant system.

12. An operator safety apparatus as recited in claim 10 and further comprising water-injection means disposed within said passageway for spraying water into said passageway to cool the flow of air passing therethrough.

13. An operator safety apparatus as recited in claim 11 wherein said motor-driven fan means includes a hydraulic motor driven by the hydraulic fluid system of the tractor.

14. An operator safety apparatus as recited in claim 11 and further comprising water-injection means disposed within said passageway for spraying water into said passageway to cool the flow of air passing therethrough.

15. An operator safety apparatus as recited in claim 11, wherein said housing is generally cylindrical in configuration along at least a part of its length and the motor-driven fan means is disposed within the cylindrical portion thereof.

16. An operator safety apparatus as recited in claim 14 wherein at least one end of said housing is provided with a screen for blocking the passage of foreign objects without substantially interfering with the flow of air through said housing.

17. An operator safety apparatus as recited in claim 7 and further comprising water-injection means disposed within said passageway for spraying water into said passageway to cool the flow of air passing therethrough.

18. An operator safety apparatus as recited in claim 1 wherein said housing is mounted directly above the space normally occupied by the operator and the flow of air is directed vertically downwardly.

19. An operator safety apparatus as recited in claim 18 and further comprising flow deflector means disposed at the downstream end of said housing for causing the flow of air to surround the operator but be directed away from the location of his head.

20. An operator safety apparatus as recited in claim 19 and further comprising heat exchange means disposed within said passageway and adapted to heat the air flowing therethrough, said heat exchange means being operatively associated with the tractor engine coolant system.

21. An operator safety apparatus as recited in claim 1 wherein said flow-directing ring means is generally circular in shape.

22. An operator safety apparatus as recited in claim 21 wherein said flow-directing ring means is in a generally flat configuration.

* * * * *